US009830845B2

(12) United States Patent
Lim et al.

(10) Patent No.: US 9,830,845 B2
(45) Date of Patent: Nov. 28, 2017

(54) GATE DRIVING CIRCUIT AND DISPLAY APPARATUS HAVING THE SAME

(71) Applicant: SAMSUNG DISPLAY CO., LTD., Yongin, Gyeonggi-Do (KR)

(72) Inventors: Jaekeun Lim, Suwon-si (KR); Ji-sun Kim, Seoul (KR); Jonghee Kim, Yongin-si (KR); Chongchul Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/958,764

(22) Filed: Dec. 3, 2015

(65) Prior Publication Data

US 2016/0210890 A1 Jul. 21, 2016

(30) Foreign Application Priority Data

Jan. 15, 2015 (KR) ........................ 10-2015-0007283

(51) Int. Cl.

*G09G 3/20* (2006.01)
*G06F 3/038* (2013.01)
*G09G 5/00* (2006.01)

(52) U.S. Cl.

CPC ....... *G09G 3/20* (2013.01); *G09G 2310/0267* (2013.01); *G09G 2310/0286* (2013.01); *G09G 2310/08* (2013.01)

(58) Field of Classification Search

CPC ....... G09G 2310/08; G09G 2310/0286; G09G 2310/0267; G09G 3/20

See application file for complete search history.

(56) References Cited

U.S. PATENT DOCUMENTS

2013/0181747 A1* 7/2013 Yoon .................... G11C 19/184 327/108
2014/0092078 A1* 4/2014 Yoon ...................... G09G 5/001 345/212

FOREIGN PATENT DOCUMENTS

JP 2006-277860 A 10/2006
JP 2011-181173 A 9/2011
KR 10-2013-0139328 A 12/2013
KR 10-2014-0042308 A 4/2014
KR 10-1493186 B1 2/2015

* cited by examiner

*Primary Examiner* — Charles Hicks
(74) *Attorney, Agent, or Firm* — Innovation Counsel LLP

(57) ABSTRACT

A gate driving circuit includes a plurality of driving stages applying gate signals to gate lines of a display panel. Among the plurality of driving stages, a k-th (k being a natural number equal to or greater than 2) includes a first node, an output part that is connected to the first node and outputs a k-th gate signal in response to a voltage of the first node, a control part that controls an electric potential of the first node, an inverter part that outputs a k-th switching signal, and a pull-down part that receives a (k−1)th switching signal from a (k−1)th driving stage of the plurality of driving stages and lowers a voltage of the output part in response to the (k−1)th switching signal.

19 Claims, 13 Drawing Sheets

GATE DRIVING CIRCUIT AND DISPLAY APPARATUS HAVING THE SAME

CROSS-REFERENCE TO RELATED APPLICATION

This U.S. non-provisional patent application claims priority under 35 U.S.C. §119 of Korean Patent Application No. 10-2015-0007283, filed on Jan. 15, 2015, the disclosure which is hereby incorporated by reference in its entirety.

BACKGROUND

1. Field

The present disclosure relates to a gate driving circuit and a display apparatus having the same. More particularly, the present disclosure relates to a gate driving circuit capable of improving a display quality and a display apparatus having the gate driving circuit.

2. Description of the Related Art

A display apparatus includes gate lines, data lines, and pixels that are connected to the gate lines and the data lines. The display apparatus includes a gate driving circuit to apply gate signals to the gate lines and a data driving circuit to apply data signals to the data lines.

The gate driving circuit includes a shift register including a plurality of driving stages. The driving stages output the gate signals respectively corresponding to the gate lines. Each of the driving stages includes transistors that are connected to each other.

SUMMARY

The present disclosure provides a gate driving circuit capable of preventing a leakage current through a first node when the gate driving circuit employs an oxide semiconductor transistor.

The present disclosure provides a display apparatus capable of improving a driving quality of the gate driving circuit in a low power driving mode.

According to one embodiments of the present disclosure, a gate driving circuit includes a plurality of driving stages applying gate signals to gate lines of a display panel. Among the plurality of driving stages, a k-th (k being a natural number equal to or greater than 2) driving stage includes a first node, an output part that is connected to the first node and outputs a k-th gate signal in response to a voltage of the first node, a control part that controls an electric potential of the first node, an inverter part that outputs a k-th switching signal, and a pull-down part that receives a (k−1)th switching signal from a (k−1)th driving stage of the plurality of driving stages and lowers a voltage of the output part in response to the (k−1)th switching signal.

According to one embodiment of the present disclosure, a display apparatus includes a display panel including a plurality of pixels displaying an image, a plurality of gate lines receiving gate signals to drive the plurality of pixels, and a plurality of data lines receiving data signals, a gate driving circuit disposed on the display panel and applying the gate signals to the gate lines, and a data driving circuit applying the data signals to the plurality of data lines.

The gate driving circuit includes a plurality of driving stages applying the gate signals to the gate lines. Among the plurality of driving stages, a k-th (k being a natural number equal to or greater than 2) driving stage includes a first node, an output part that is connected to the first node and outputs a k-th gate signal in response to a voltage of the first node, a control part that controls an electric potential of the first node, an inverter part that outputs a k-th switching signal, and a pull-down part that receives a (k−1)th switching signal from a (k−1)th driving stage of the plurality of driving stages and lowers a voltage of the output part in response to the (k−1)th switching signal.

According to the above, the electric potential of the k-th gate signal and the first node is lowered by the (k−1)th switching signal that provided from the inverter part of the (k−1)th driving stage, and the circuit configuration of the gate driving circuit is simplified.

In addition, a carry signal or a gate signal of each driving stage is fedback to a connection node of two transistors that is connected to an input terminal and a control terminal of the corresponding driving stage in series, therefore one of the two transistors may be prevented from burning or deteriorating and a condition of withstanding voltage (Vds) of the two transistors may be relieved.

Further, since the current leakage of the first node is reduced, a margin in high temperature is expanded, and the capacitance of a boosting capacitor is reduced, an overall size of the gate driving circuit may be reduced.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
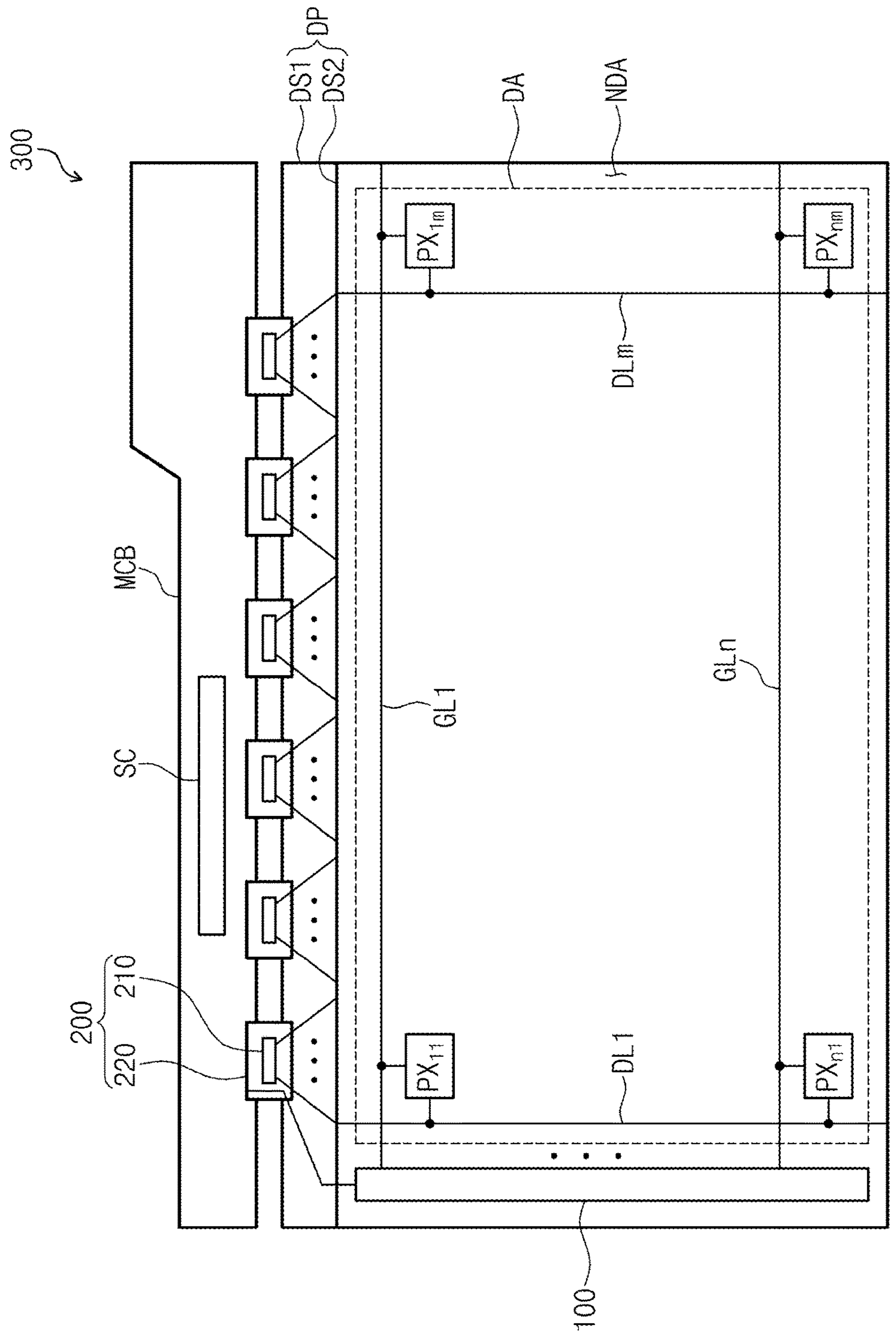
FIG. 1 is a plan view showing a display apparatus, according to an exemplary embodiment of the present disclosure.

It will be understood that when an element or layer is referred to as being "on," "connected to," or "coupled to"

another element or layer, it can be directly on, connected or coupled to the other element or layer or intervening elements or layers may be present. In contrast, when an element is referred to as being "directly on," "directly connected to," or "directly coupled to" another element or layer, there may be no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations), and the spatially relative descriptors used herein are interpreted accordingly.

The terminology used herein is for the purpose of describing particular embodiments and is not intended to be limiting of the present disclosure. As used herein, the singular forms, "a," "an," and "the" are intended to include the plural forms as well, unless the context clearly indicates otherwise. It will be further understood that the terms "includes" and/or "including," when used in this specification, specify the presence of stated feature(s), integer(s), step(s), operation (s), element(s), and/or component(s), but do not preclude the presence or addition of one or more other features, integers, steps, operations, elements, components, and/or groups thereof.

Unless otherwise defined, terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, the present disclosure will be explained in detail with reference to the accompanying drawings.

FIG. 1 is a plan view showing a display apparatus, according to an exemplary embodiment of the present disclosure. The display apparatus 300 includes a display panel DP, a gate driving circuit 100, and a data driving circuit 200. The display panel DP may be one of various types of display panels, such as a liquid crystal display panel, an organic light emitting display panel, an electrophoretic display panel, and an electrowetting display panel. In the present exemplary embodiment, the liquid crystal display panel will be described as the display panel DP, however, it is understood that the display panel DP may be of other types of display panels without deviating from the scope of the present disclosure. The display apparatus 300 may further include a polarizer and a backlight unit.

The display panel DP includes a first substrate DS1, a second substrate DS2 spaced apart from the first substrate DS1, and a liquid crystal layer disposed between the first and second substrates DS1 and DS2. When viewed in a plan view, the display panel DP includes a display area DA in which a plurality of pixels $PX_{11}$ to $PX_{nm}$ are arranged and a non-display area NDA surrounding the display area DA.

The display panel DP includes a plurality of gate lines GL1 to GLn disposed on the first substrate DS1 and a plurality of data lines DL1 to DLm that cross the gate lines GL1 to GLn. The gate lines GL1 to GLn are connected to the gate driving circuit 100. The data lines DL1 to DLm are connected to the data driving circuit 200.

FIG. 1 shows a portion of the pixels $PX_{11}$ to $PX_{nm}$. Each of the pixels $PX_{11}$ to $PX_{nm}$ is connected to a corresponding gate line of the gate lines GL1 to GLn and a corresponding data line of the data lines DL1 to DLm. The pixels $PX_{11}$ to $PX_{nm}$, are grouped in a plurality of groups according to colors displayed therein. Each of the pixels $PX_{11}$ to $PX_{nm}$ displays one of primary colors. The primary colors may include red, green, blue, and white colors, but they should not be limited thereto or thereby. The primary colors may include other colors including yellow, cyan, and magenta colors.

The gate driving circuit 100 and the data driving circuit 200 receive control signals from a signal controller SC, e.g., a timing controller. The signal controller SC is mounted on a main circuit board MCB. The signal controller SC may receive image data and the control signals from an external graphic controller (not shown). The control signals may include, but are not limited to, a vertical synchronization signal as a frame distinction signal, a horizontal synchronization signal as a row distinction signal, a data enable signal maintained at a high level during a data input period, and a main clock signal.

The signal controller SC converts the image data in accordance with the specification of the data driving circuit 200 and applies the converted image data to the data driving circuit 200. The signal controller SC generates a gate control signal and a data control signal based on the control signals. The signal controller SC applies the gate control signal to the gate driving circuit 100 and applies the data control signal to the data driving circuit 200.

The gate driving circuit 100 generates gate signals GS1 to GSn in response to the gate control signal and applied the gate signals GS1 to GSn to the gate lines GL1 to GLn. The gate driving circuit 100 may be substantially and simultaneously formed with the pixels $PX_{11}$ to $PX_{nm}$ through a thin film process. For example, the gate driving circuit 100 may be directly formed in the non-display area NDA in the form of an amorphous silicon TFT gate driver circuit or an oxide semiconductor TFT gate driver circuit.

FIG. 1 shows one gate driving circuit 100 connected to one ends of the gate lines GL1 to GLn. However, according to another embodiment, the display apparatus 300 may include two gate driving circuits. In one example, one of the two gate driving circuits is connected to one ends, e.g., left ends, of the gate lines GL1 to GLn and the other of the two gate driving circuits is connected to the other ends, e.g., right ends, of the gate lines GL1 to GLn. In another example, one of the two gate driving circuits is connected to odd-numbered gate lines and the other of the two gate driving circuits is connected to even-numbered gate lines.

The data driving circuit 200 generates grayscale voltages corresponding to the image data provided from the signal controller SC in response to the data control signal from the signal controller SC. The data driving circuit 200 applies the grayscale voltages to the data lines DL1 to DLm as data voltages.

The data voltages include positive polarity (+) data voltages having a positive value with respect to a reference voltage and/or negative polarity (−) data voltages having a negative value with respect to the reference voltage. The polarity of the data voltages is inverted every frame period; a portion of the data voltages has the positive polarity in a particular frame period, and the other portion of the data voltages has the negative polarity in the particular frame period.

As illustrated in FIG. 1, the data driving circuit 200 herein may refer to a plurality of data driving circuits, and each of the plurality of data driving circuits may apply data voltages to a subset of the data lines DL1 to DLm. Each of the data driving circuit 200 includes a driving chip 210 and a flexible printed circuit board 220 on which the driving chip 210 is mounted. The flexible printed circuit boards 220 electrically connect the main circuit board MCB and the first substrate DS1. Each of the driving chips 210 applies a corresponding data signal of the data signals to the corresponding data line(s) of the data lines DL1 to DLm.

In FIG. 1, the data driving circuit 200 is provided to the display apparatus 300 in a chip-on-film (COF) manner, but it should not be limited thereto or thereby. The data driving circuit 200 may be disposed on the non-display area NDA of the first substrate DS1 in a chip-on-glass (COG) manner.

Figure 2:
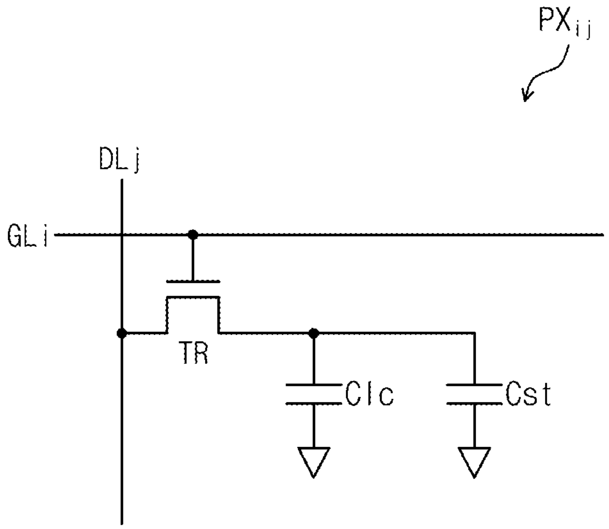
FIG. 2 is a circuit diagram of a pixel shown in FIG. 1.
Figure 3:
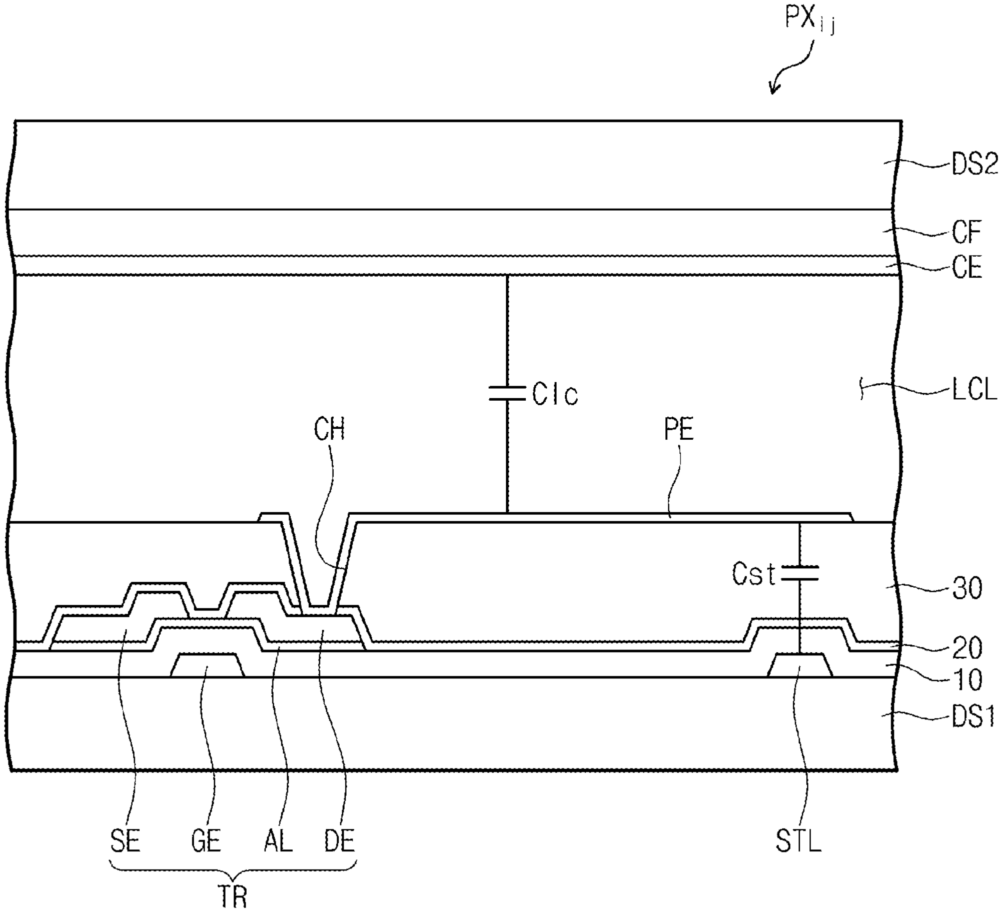
FIG. 3 is a cross-sectional view of a pixel shown in FIG. 1.

FIG. 2 is a circuit diagram of a pixel shown in FIG. 1, and FIG. 3 is a cross-sectional view of a pixel shown in FIG. 1. Each of the pixels $PX_{11}$ to $PX_{nm}$ shown in FIG. 1 may have the circuit diagram shown in FIG. 2.

Referring to FIG. 2, an (i×j)th pixel $PX_{ij}$ among the pixels $PX_{11}$ to $PX_{nm}$ includes a pixel transistor TR, a liquid crystal capacitor Clc, and a storage capacitor Cst. The pixel transistor TR may be a thin film transistor. The storage capacitor Cst may be omitted.

The pixel transistor TR is electrically connected to an i-th gate line GLi and a j-th data line DLj. The pixel transistor TR outputs a pixel voltage corresponding to the data signal provided through the j-th data line DLj in response to the gate signal provided through the i-th gate line GLi.

The liquid crystal capacitor Clc is charged with the pixel voltage that is output from the pixel transistor TR. An alignment of liquid crystal molecules included in the liquid crystal layer LCL (refer to FIG. 3) is changed depending on an amount of electric charges of the liquid crystal capacitor Clc. A transmittance of a light incident to the liquid crystal layer LCL is controlled by the alignment of the liquid crystal molecules.

The storage capacitor Cst is connected to the liquid crystal capacitor Clc in parallel. The storage capacitor Cst maintains the alignment of the liquid crystal molecules for a predetermined period.

As shown in FIGS. 2 and 3, the pixel transistor TR includes a control electrode (or gate electrode) GE connected to the i-th gate line GLi, an active part AL overlapped with the control electrode GE, an input electrode (or source electrode) SE connected to the j-th data line DLj, and an output electrode (or drain electrode) DE spaced apart from the input electrode SE.

The liquid crystal capacitor Clc includes a pixel electrode PE and a common electrode CE. The storage capacitor Cst includes the pixel electrode PE and a portion of a storage line STL that is overlapped with the pixel electrode PE.

The i-th gate line GLi and the storage line STL are disposed on a surface of the first substrate DS1. The control electrode GE is branched from the i-th gate line GLi. The i-th gate line GLi and the storage line STL may be made of aluminum (Al), silver (Ag), copper (Cu), molybdenum (Mo), chromium (Cr), tantalum (Ta), titanium (Ti), or an alloy thereof. Each of the i-th gate line GLi and the storage line STL may have a multi-layer structure including a titanium layer and a copper layer.

A first insulating layer 10 is disposed on the first substrate DS1 to cover the i-th gate line GLi, the control electrode GE, and the storage line STL. The first insulating layer 10 may be an organic layer or an inorganic layer. The first insulating layer 10 may have a multi-layer structure including a silicon nitride layer and a silicon oxide layer.

The active part AL is disposed on the first insulating layer 10 to overlap the control electrode GE. The active part AL includes a semiconductor layer and an ohmic contact layer that are sequentially disposed on the first insulating layer 10.

The semiconductor layer may be made of amorphous silicon, polysilicon, or metal oxide semiconductor. The ohmic contact layer may be more highly doped than the semiconductor layer and may be divided into two portions spaced apart from each other.

The output electrode DE and the input electrode SE are disposed on the active part AL. The output electrode DE and the input electrode SE are spaced apart from each other, and each of the output electrode DE and the input electrode SE is partially overlapped with the control electrode GE.

A second insulating layer 20 is disposed on the first insulating layer 10 to cover the active part AL, the output electrode DE, and the input electrode SE. The second insulating layer 20 may be an organic layer or an inorganic layer. The second insulating layer 20 may have a multi-layer structure including a silicon nitride layer and a silicon oxide layer.

A third insulating layer 30 is disposed on the second insulating layer 20. The third insulating layer 30 provides a flat plane surface. The third insulating layer 30 may be made of an organic material.

The pixel electrode PE is disposed on the third insulating layer 30. The pixel electrode PE is connected to the output electrode DE through a contact hole CH formed through the second and third insulating layers 20 and 30. A lower alignment layer (not shown) may be disposed on the third insulating layer 30 to cover the pixel electrode PE.

A color filter layer CF is disposed on a surface of the second substrate DS2. The common electrode CE is disposed on the color filter layer CF. The common electrode CE is applied with a reference voltage. The reference voltage may have a value different from that of the pixel voltage. An upper alignment layer (not shown) is disposed on the common electrode CE to cover the common electrode CE. An overcoating layer (not shown) may be disposed between the color filter layer CF and the common electrode CE to provide a flat plane surface.

The pixel electrode PE and the common electrode CE that are disposed to face each other such that the liquid crystal layer LCL that is disposed between the pixel electrode PE and the common electrode CE form the liquid crystal capacitor Clc. In addition, the pixel electrode PE and a portion of the storage line STL that are disposed to face each other such that the first, second, and third insulating layer that are disposed between the pixel electrode PE and the portion of the storage line STL form the storage capacitor Cst. The storage line STL may receive a storage voltage having an electric potential different from that of the pixel voltage. The storage voltage may have the same electric potential as the reference voltage.

According to one embodiment, at least one of the color filter layer CF and the common electrode CE may be disposed on the first substrate DS1. In other words, the liquid crystal display panel may include a vertical alignment (VA) mode, a patterned vertical alignment (PVA) mode, an in-plane switching (IPS) mode, a fringe-field switching (FFS) mode, or a plane-to-line switching (PLS) mode pixel.

Figure 4:
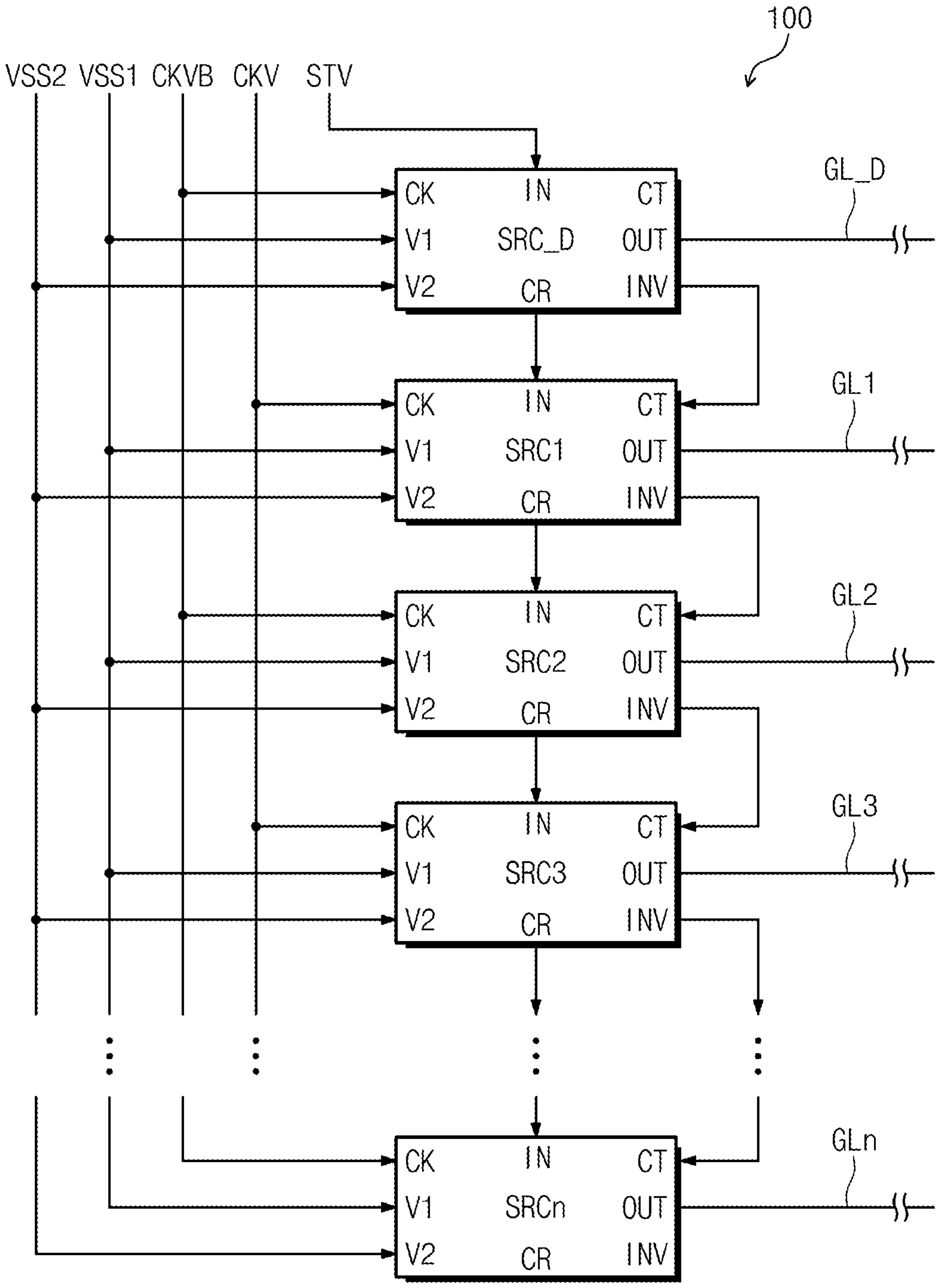
FIG. 4 is a block diagram of a gate driving circuit shown in FIG. 1.

FIG. 4 is a block diagram of the gate driving circuit 100 shown in FIG. 1. The gate driving circuit 100 includes a plurality of driving stages SRC1 to SRCn. The driving stages SRC1 to SRCn are connected in series and sequentially operated. The gate driving circuit 100 may further include a dummy stage SRC_D that is operated prior to the driving stages SRC1 to SRCn.

The driving stages SRC1 to SRCn are connected to the gate lines GL1 to GLn to apply the gate signals to the gate lines GL1 to GLn, respectively. The dummy stage SRC_D is connected to a dummy gate line GL_D to apply a dummy gate signal to the dummy gate line GL_D.

Each of the driving stages SRC1 to SRCn includes an output terminal OUT, a carry terminal CR, an input terminal IN, a control terminal CT, an inverter terminal INV, a clock terminal CK, a first voltage input terminal V1, and a second voltage input terminal V2. The dummy stage SRC_D has the same circuit configuration as the driving stages SRC1 to SRCn and includes the same input/output terminals as those of the driving stages SRC1 to SRCn. Hereinafter, the driving stages SRC1 to SRCn will be described in detail and detailed description of the dummy stage SRC_D will be omitted.

The output terminal OUT of each of the driving stages SRC1 to SRCn is connected to a corresponding gate line of the gate lines GL1 to GLn. The gate signals generated by the driving stages SRC1 to SRCn are applied to the gate lines GL1 to GLn through the output terminals OUT.

The carry terminal CR of each of the driving stages SRC1 to SRCn is electrically connected to the input terminal IN of a next driving stage. The carry terminal CR of each of the driving stages SRC1 to SRCn outputs a carry signal.

The input terminal IN of each of the driving stages SRC1 to SRCn receives the carry signal of a previous driving stage. For instance, the input terminal of a third driving stages SRC3 receives the carry signal of a second driving stage SRC2. Among the driving stages SRC1 to SRCn, the input terminal IN of a first driving stage SRC1 receives a dummy carry signal output from the carry terminal CR of the dummy stage SRC_D. The input terminal IN of the dummy stage SRC_D receives the vertical start signal STV starting the drive of the gate driving circuit 100. The vertical start signal STV is included in the gate control signal that is applied to the gate driving circuit 100 from the signal controller SC.

The control terminal CT of each of the driving stages SRC1 to SRCn is electrically connected to the inverter terminal INV of the previous driving stage. The inverter terminal INV of each of the driving stages SRC1 to SRCn outputs a switching signal.

The control terminal CT of each of the driving stages SRC1 to SRCn receives the switching signal of the previous driving stage. For instance, the control terminal CT of the third driving stage SRC3 receives a second switching signal output from the inverter terminal INV of the second driving stage SRC2. The control terminal CT of the first driving stage SRC1 receives a dummy switching signal output from the inverter terminal of the dummy stage SRC_D.

The clock terminal CK of each of the driving stages SRC1 to SRCn receives a first clock signal CKV or a second clock signal CKVB. Among the driving stages SRC1 to SRCn, the clock terminals CK of odd-numbered driving stages SRC1 and SRC3 receive the first clock signal CKV whereas the clock terminals CK of even-numbered driving stages SRC2 and SRCn receive the second clock signal CKVB. The first clock signal CKV and the second clock signal CKVB may have different phases from each other.

The first voltage input terminal V1 of each of the driving stages SRC1 to SRCn receives a first discharging voltage VSS1 whereas the second voltage input terminal V2 of each of the driving stages SRC1 to SRCn receives a second discharging voltage VSS2. In one embodiment, the second discharging voltage VSS2 has a voltage level lower than that of the first discharging voltage VSS1.

In some embodiments, one or more of the output terminal OUT, the input terminal IN, the carry terminal CR, the control terminal CT, the inverter terminal INV, the clock terminal CK, the first voltage input terminal V1, and the second voltage input terminal V2 of each of the driving stages SRC1 to SRCn may be omitted or additional terminals may be added to each of the driving stages SRC1 to SRCn. For instance, one of the first and second voltage input terminals V1 and V2 may be omitted. In addition, the connectivity between the driving stages SRC1 to SRCn may be changed in various ways as described in detail with reference to FIGS. 7 to 11.

Figure 5:
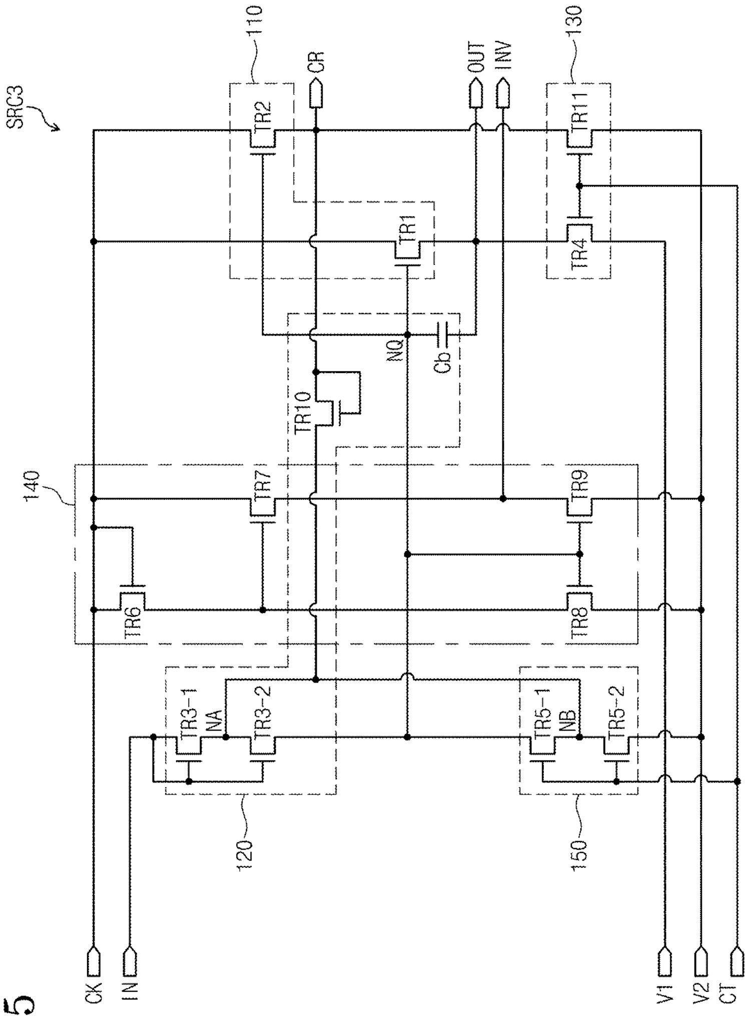
FIG. 5 is a circuit diagram of a driving stage shown in FIG. 4.
Figure 6:
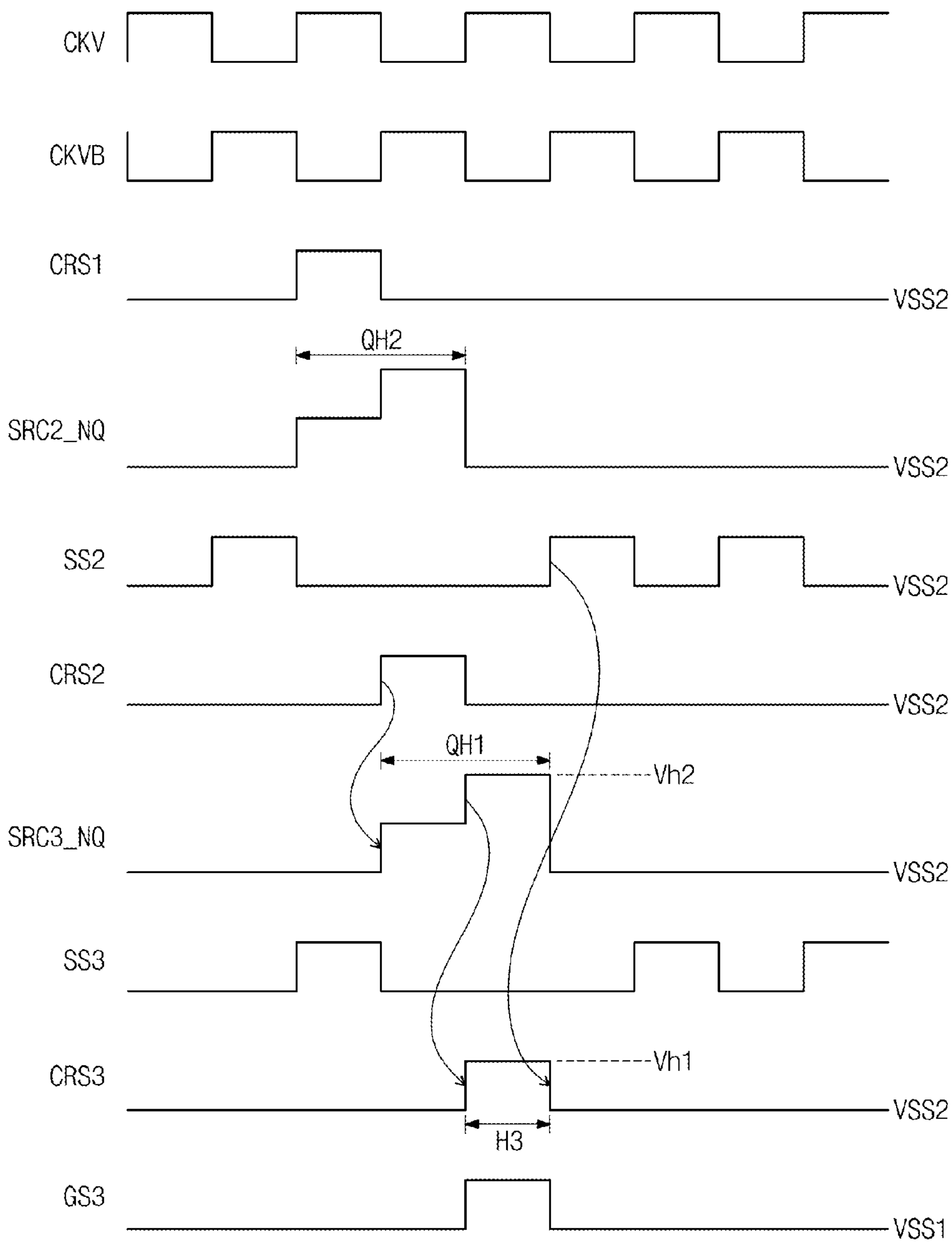
FIG. 6 is a waveform diagram showing input and output signals of the driving stage shown in FIG. 5.

FIG. 5 is a circuit diagram of a driving stage shown in FIG. 4 and FIG. 6 is a waveform diagram showing input and output signals of the driving stage shown in FIG. 5.

FIG. 5 shows the third driving stage SRC3 of the driving stages SRC1 to SRCn shown in FIG. 4 as a representative example. Each of the driving stages SRC1 to SRCn shown in FIG. 4 may have the same circuit configuration as that of the third driving stage SRC3.

Referring to FIG. 5, the third driving stage SRC3 includes an output part 110, a control part 120, a pull-down part 130, an inverter part 140, and a discharge part 150. The output part 110 includes a first output transistor TR1 outputting the third gate signal GS3 and a second output transistor TR2 outputting the third carry signal. The first output transistor TR1 includes an input electrode applied with the first clock signal CKV, a control electrode connected to a first node NQ, and an output electrode connected to the output terminal OUT that output the third gate signal GS3. The second output transistor TR2 includes an input electrode applied with the first clock signal CKV, a control electrode connected to the first node NQ, and an output electrode connected to the carry terminal CR that the third carry signal CRS3.

As shown in FIG. 6, each of the first and second clock signals CKV and CKVB includes low periods in which a voltage level is relatively low and high periods in which a voltage level is relatively high. The first clock signal CKV has a phase opposite to that of the second clock signal CKVB. The first and second clock signals CKV and CKVB have a phase difference of about 180 degrees. Accordingly, the low periods of the first clock signal CKV are disposed to correspond to the high periods of the second clock signal CKVB, and the high periods of the first clock signal CKV are disposed to correspond to the low periods of the second clock signal CKVB.

Referring to FIG. 5, the control part 120 is connected to the carry terminal CR of the previous driving stage (i.e., the second driving stage SRC2) to turn on the output part 110 in response to the previous carry signal (i.e., the second carry signal CRS2). The control part 120 includes a first control transistor TR31, a second control transistor TR3_2, a third control transistor TR10, and a capacitor Cb.

The first control transistor TR3_1 applies a first control signal to control an electric potential of the first node NQ to a second node NA before the third gate signal GS3 is output. The first control transistor TR3_1 includes a control electrode and an input electrode that are connected to the input terminal IN to commonly receive the second carry signal CRS2 of the second driving stage SRC2. The first control transistor TR3_1 includes an output electrode connected to the second node NA. In the present exemplary embodiment, the first control signal may be the second carry signal CRS2.

The second control transistor TR3_2 is substantially simultaneously turned on with the first control transistor TR3_1 to apply the first control signal output from the first control transistor TR3_1 to the first node NQ. The second control transistor TR3_2 includes an input electrode connected to the second node NA, a control electrode receiving the second carry signal CRS2 of the second driving stage SRC2 from the input terminal IN, and an output electrode connected to the first node NQ.

The third control transistor TR10 applies the second control signal to the second node NA. The third control transistor TR10 is diode-connected between the output electrode of the second output transistor TR2 and the second node NA such that a current path is formed between the output electrode of the second output transistor TR2 and the second node NA. The third control transistor TR10 includes a control electrode and an input electrode that are commonly connected to the output electrode of the second output transistor TR2 and an output electrode connected to the second node NA. The second control signal may be the same as the third carry signal CRS3. The capacitor Cb is connected between the output electrode of the first output transistor TR1 and the control electrode (i.e., the first node NQ) of the first output transistor TR1.

Referring to FIGS. 5 and 6, the first and second control transistors TR3_1 and TR3_2 are turned on in response to the second carry signal CRS2, and the electric potential of the first node NQ increases. When the electric potential of the control electrode (i.e., the first node NQ) of the first and second output transistors TR1 and TR2 is boosted up by the capacitor Cb, the first and second output transistors TR1 and TR2 are turned on. Therefore, the third carry signal CRS3 having the high level and the third gate signal GS3 having the high level are respectively output through the carry terminal CR and the output terminal OUT. When the electric potential of the third carry signal CRS3 increases, the third control transistor TR10 is turned on, and the third carry signal CRS3 is applied to the second node NA.

As shown in FIG. 6, the third carry signal CRS3 has a first high level Vh1 in the high period, i.e., a third scanning period H3, and the first node NQ of the third driving stage SRC3 has a second high level Vh2 in the third scanning period H3. For instance, the first high level Vh1 is about 12 volts and the second high level Vh2 is about 30 volts that is higher than that of the first high level Vh1. When the third control transistor TR10 is turned on in response to the third carry signal CRS3, the third carry signal CRS3 is applied to the second node NA, and the electric potential of the second node NA has the first high level Vh1.

The second carry signal CRS2 has the low level in the third scanning period H3 that corresponds to an electric potential of the second discharging voltage VSS2. When the second discharging voltage VSS2 has the voltage level of about −10 volts, a difference in electric potential between the input terminal IN of the third driving stage SRC3 and the first node NQ of the third driving stage SRC3 is about 40 volts. When the first and second control transistors TR3_1 and TR3_2 have the same channel size, the second node NA has the electric potential of about 20 volts corresponding to a half of the electric potential difference of about 40 volts. However, although the first and second control transistors TR3_1 and TR3_2 have the same channel size, the electric potential of the second node NA falls down to the electric potential of about −10 volts. As a result, a gate-source voltage Vgs of the second control transistor TR3_2 increases, and a leakage current of the second control transistor TR3_2 increases in the third scanning period H3.

However, as shown in FIG. 5, when the third control transistor TR10 is turned on in response to the third carry signal CRS3, the third carry signal CRS3 is applied to the second node NA. Therefore, the electric potential of the second node NA may have the first high level Vh1 in the third scanning period H3. In this case, the first and second control transistors TR3_1 and TR3_2 may be prevented from burning and deteriorating due to an overvoltage applied to one of the first and second control transistors TR3_1 and TR3_2, thus a condition of a withstanding voltage Vds of the first and second control transistors TR3_1 and TR3_2 may be relieved.

The pull-down part 130 lowers the electric potential of the third carry signal CSR3 and the third gate signal GS3 in response to the switching signal (i.e., a second switching signal SS2) of the previous driving stage (i.e., the second driving stage SRC2). The pull-down part 130 includes first and second pull-down transistors TR4 and TR11 to respectively lower the electric potential of the output terminal OUT and the carry terminal CR in response to the second switching signal SS2.

The first pull-down transistor TR4 includes an input electrode connected to the first voltage input terminal V1, a control electrode connected to the control terminal CT, and an output electrode connected to the output electrode of the first output transistor TR1. The second pull-down transistor TR11 includes an input electrode connected to the second voltage input terminal V2, a control electrode connected to the control terminal CT, and an output electrode connected to the output electrode of the second output transistor TR2. The control terminal CT is connected to the inverter terminal INV of the second driving stage SRC2 to receive the second switching signal SS2.

The inverter part 140 of the third driving stage SRC3 applies the third switching signal SS3 to the inverter terminal INV. The inverter part 140 includes first, second, third, and fourth inverter transistors TR6, TR7, TR8, and TR9. The first inverter transistor TR6 includes input and control electrodes that are commonly connected to the clock terminal CK and an output electrode connected to a control electrode of the second inverter transistor TR7. The second inverter transistor TR7 includes an input electrode connected to the clock terminal CK and an output electrode connected to the inverter terminal INV.

The third inverter transistor TR8 includes an output electrode connected to the output electrode of the first inverter transistor TR6, a control electrode connected to the first node NQ, and an input electrode connected to the second voltage input terminal V2. The fourth inverter transistor TR9 includes an output electrode connected to the inverter terminal INV, a control electrode connected to the first node NQ, and an input electrode connected to the second voltage input terminal V2. In one embodiment, the input electrode of the third and fourth inverter transistors TR8 and TR9 is connected to the first voltage input terminal V1.

The first and second inverter transistors TR6 and TR7 are turned on in the high period of the first clock signal CKV to output the first clock signal CKV. The third and fourth inverter transistors TR8 and TR9 are driven depending on the electric potential of the first node NQ. As shown in FIG. 6, the third and fourth inverter transistors TR8 and TR9 are turned on during a first period QH1, in which the electric potential of the first node NQ increases, and lowers the high voltage of the first clock signal CKV output from the first and second inverter transistors TR6 and TR7. The third and fourth inverter transistors TR8 and TR9 are turned off during a period except for the first period QH1, and the output voltage output from the first and second inverter transistors TR6 and TR7 is applied to the inverter terminal INV. Thus, the third switching signal SS3 applied to the inverter terminal INV has the low level corresponding to the second discharging voltage VSS2 in the first period QH1, and a signal corresponding to the first clock signal CKV is output as the third switching signal SS3 during a remaining period except for the first period QH1.

Referring to FIGS. 4 and 6, the second driving stage SRC2 receives the first carry signal CRS1 from the first driving stage SRC1 and increases the electric potential of the first node NQ of the second driving stage SRC2. The inverter part 140 of the second driving stage SRC2 has the low level during a second period QH2 in which the electric potential of the first node SRC2_NQ increases, and a signal corresponding to the second clock signal CKVB is output as the second switching signals SS2 during a remaining period except for the second period QH2. The second switching signal SS2 is applied to the control terminal CT of the third driving stage SRC3. Accordingly, the third carry signal CRS3 and the third gate signal GS3 fall down at a first rising edge of the second switching signal SS2. The first and second pull-down transistors TR4 and TR11 of the third driving stage SRC3 are turned on during the high period of the second switching signal SS2 to respectively hold the third gate signal GS3 and the third carry signal CRS3 to the first and second discharging voltages VSS1 and VSS2. Therefore, the third carry signal CRS3 and the third gate signal GS3 may not have ripples at the rising edge of the first clock signal CKV.

Referring to FIGS. 5 and 6, the discharge part 150 includes first and second discharging transistors TR5_1 and TR5_2 that lower the electric potential of the first node NQ in response to the second switching signal SS2 of the second driving stage SRC2. The first and second discharging transistors TR5_1 and TR5_2 are connected in series between the second voltage input terminal V2 and the first node NQ. The control electrodes of the first and second discharging transistors TR5_1 and TR5_2 are commonly connected to the control terminal CT. The first discharging transistor TR5_1 includes a control electrode connected to the control terminal CT to receive the second switching signal SS2, an input electrode connected to a third node NB, and an output electrode connected to the first node NQ. The second discharging transistor TR5_2 includes a control electrode connected to the control terminal CT to receive the second switching signal SS2, an input electrode connected to the second voltage input voltage terminal V2, and an output electrode connected to the third node NB. The first and second discharging transistors TR5_1 and TR5_2 apply the second discharging voltage VSS2 to the first node NQ in response to the second switching signal SS2 that is output from the second driving stage SRC2.

In some embodiments, one of the first and second discharging transistors TR5_1 and TR5_2 of the discharge part 150 may be omitted. In addition, the first and second discharging transistors TR5_1 and TR5_2 may be connected to the first voltage input terminal V1 other than the second voltage input terminal V2.

The third control transistor TR10 is diode-connected between the third node NB and the carry terminal CR. Accordingly, when the electric potential of the third carry signal CRS3 increases, the third control transistor TR10 is turned on, and the third carry signal CRS3 is applied to the third node NB.

For example, the electric potential of the first node NQ is boosted to the voltage level of about 30 volts, and the second discharging voltage VSS2 has the voltage level of about −10 volts in the third scanning period H3. In this case, a difference in electric potential between the second voltage input terminal V2 and the first node NQ is about 40 volts. When the first and second discharging transistors TR5_1 and TR5_2 have the same channel size, the third node NB has the electric potential of about 20 volts corresponding to a half of the electric potential difference of about 40 volts. However, although the first and second discharging transistors TR5_1 and TR5_2 have the same channel size, the electric potential of the third node NB may fall down to the electric potential of about −10 volts. As a result, a gate-source voltage Vgs of the first discharging transistor TR5_1 increases, and a leakage current of the first discharging transistor TR5_1 increases in the third scanning period H3.

However, as shown in FIG. 5, when the third control transistor TR10 is turned on in response to the third carry signal CRS3, the third carry signal CRS3 is applied to the third node NB. Therefore, the electric potential of the third node NB may have the first high level Vh1 in the third scanning period H3. Therefore, the first and second discharging transistors TR5_1 and TR5_2 may be prevented from burning and deteriorating due to an overvoltage applied to one of the first and second discharging transistors TR5_1 and TR5_2, and a condition of a withstanding voltage Vds of the first and second discharging transistors TR5_1 and TR5_2 may be relieved.

As described above, the electric potential of a k-th gate signal, a k-th carry signal, and the first node NQ is lowered or discharged by the (k−1)th switching signal from the inverter part of the previous driving stage, thus the lowered or discharged state is stably maintained.

Figure 7:
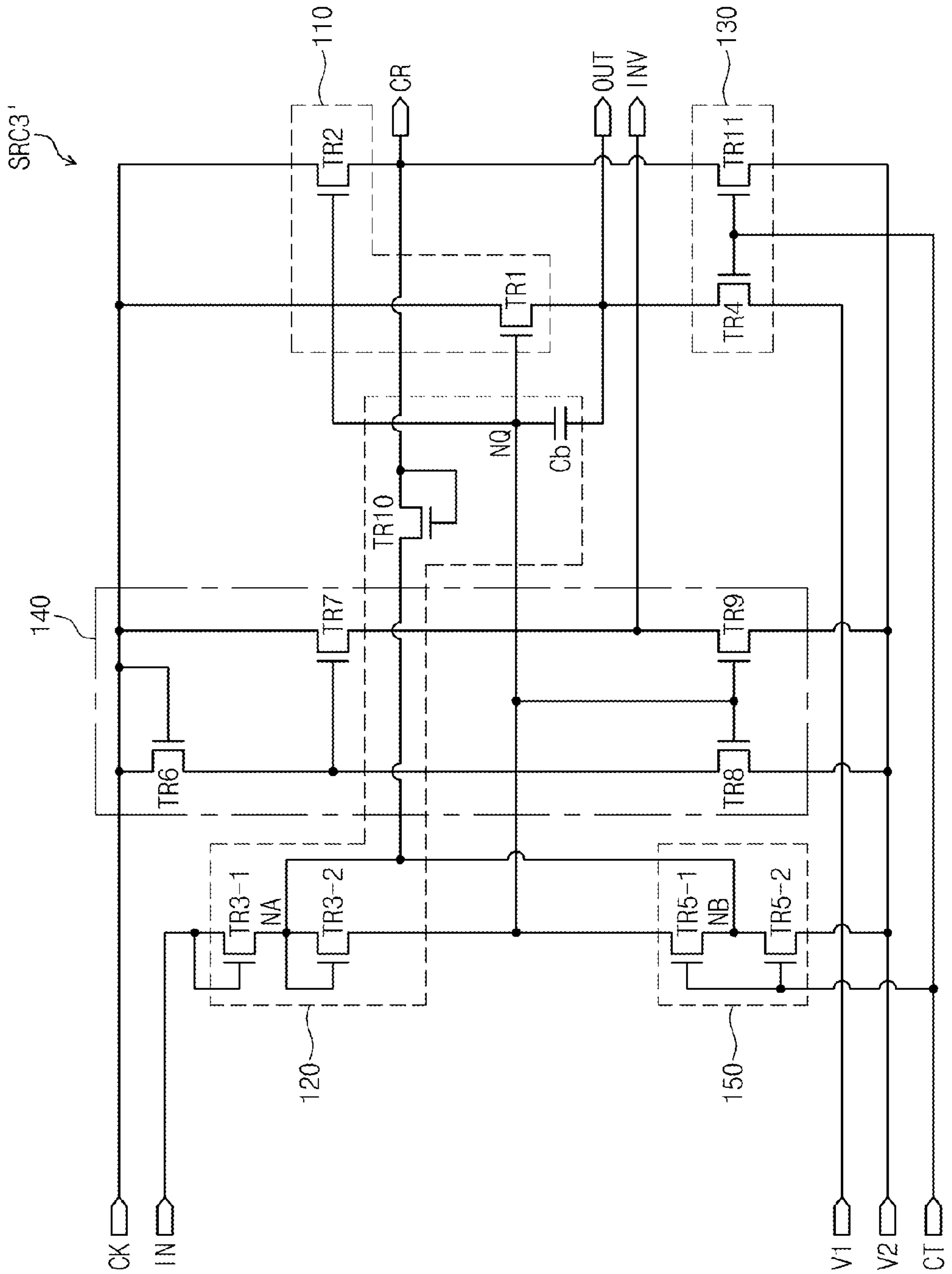
FIG. 7 is a circuit diagram showing a driving stage, according to another exemplary embodiment of the present disclosure.

FIG. 7 is a circuit diagram showing a driving stage SRC3', according to another exemplary embodiment of the present disclosure. In FIG. 7, the same reference numerals denote the same elements in FIG. 6, thus detailed description of the same elements will be omitted.

The driving stage SRC3' shown in FIG. 7 has the same structure and function as those of the driving stage SRC3 shown in FIG. 5 except for a control part 120A. In the control part 120A, a second transistor TR3_2 includes an output electrode connected to the second node NA, an input electrode connected to the carry terminal CR, and a control electrode connected to the output terminal OUT. A third control transistor TR10 applies the third carry signal CRS3 to the second node NA during the third scanning period H3 in response to the third carry signal CRS3. Accordingly, an off leakage current of the first and second control transistors TR3_1 and TR3_2 is reduced during the third scanning period H3.

According to one embodiment, the input electrode of the third control transistor TR10 may be connected to the output terminal OUT, and the control electrode of the third control transistor TR10 may be connected to the carry terminal CR. According to another embodiment, the input electrode of the third control transistor TR10 may be connected to the carry terminal CR, and the control electrode of the third control transistor TR10 may be connected to the output terminal OUT.

Figure 8:
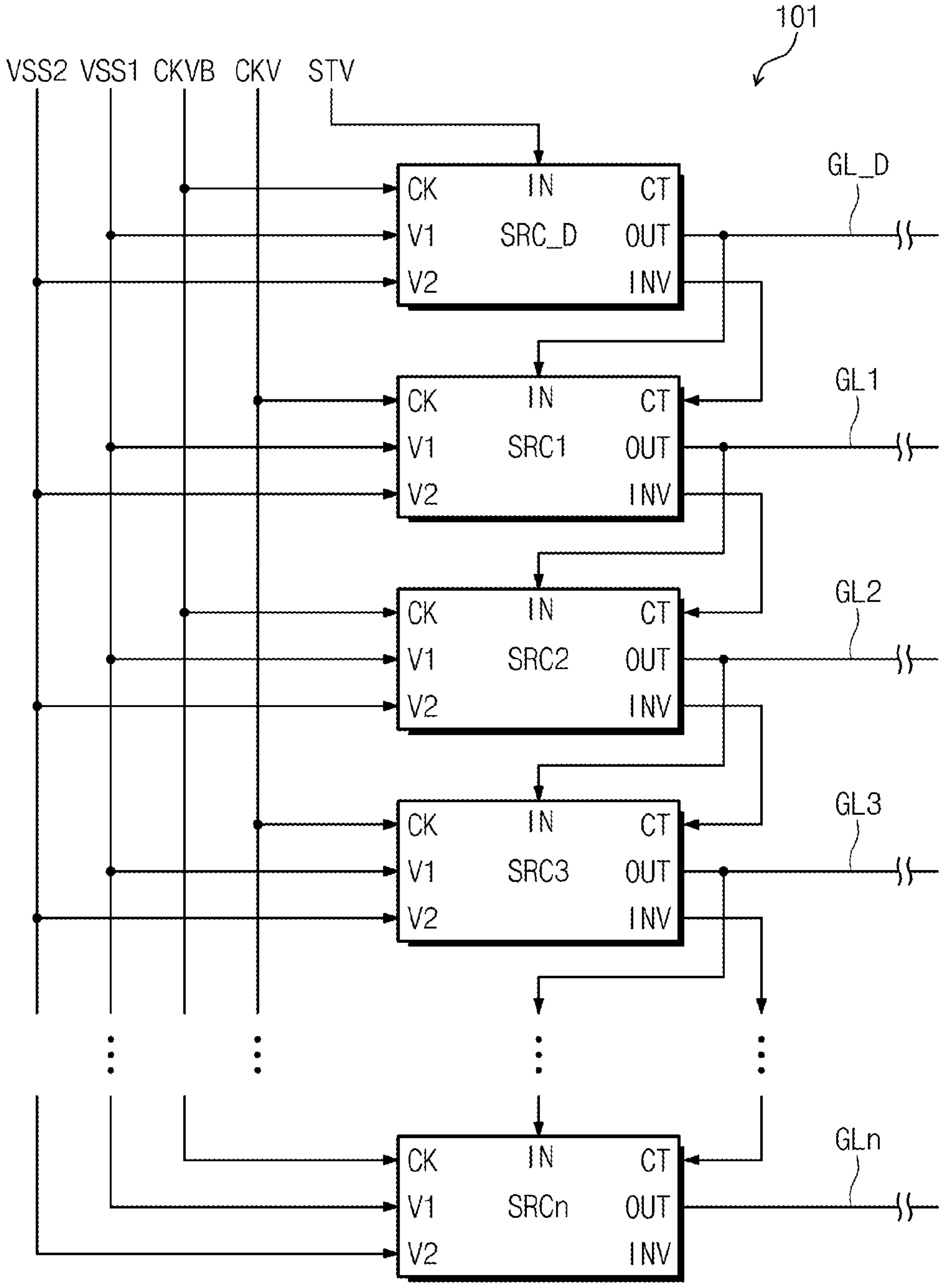
FIG. 8 is a block diagram showing a gate driving circuit, according to another exemplary embodiment of the present disclosure.
Figure 9:
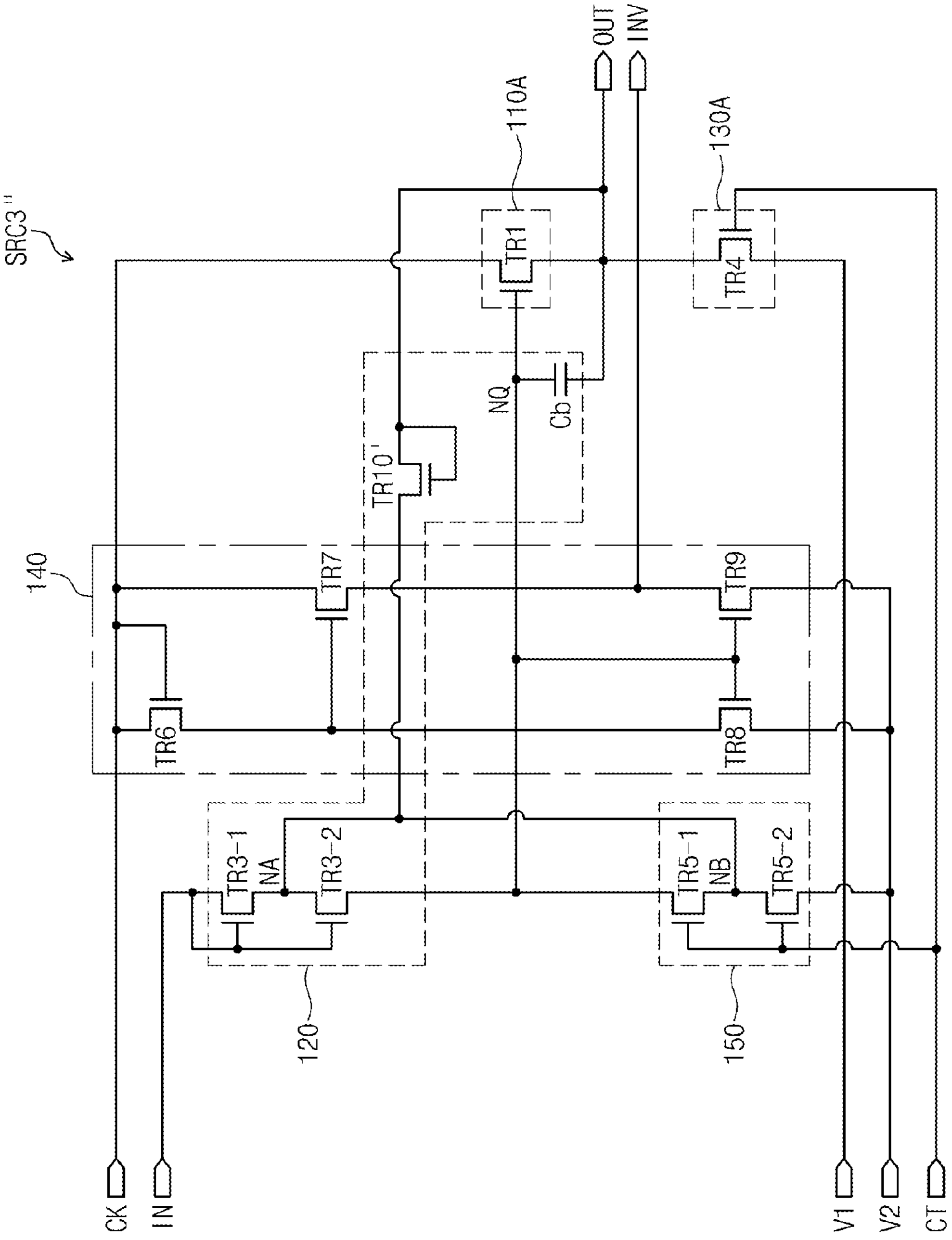
FIG. 9 is a circuit diagram showing a driving stage shown in FIG. 8.

FIG. 8 is a block diagram showing a gate driving circuit 101, according to another exemplary embodiment of the present disclosure. FIG. 9 is a circuit diagram showing a driving stage shown in FIG. 8. In FIGS. 8 and 9, the same reference numerals denote the same elements in FIGS. 4 and 5, and detailed descriptions of the same elements will be omitted.

Referring to FIG. 8, the gate driving circuit 101 includes a plurality of driving stages SRC1 to SRCn. Each of the driving stages SRC1 to SRCn includes an output terminal OUT, an input terminal IN, a control terminal CT, an inverter terminal INV, a clock terminal CK, a first voltage input terminal V1, and a second voltage input terminal V2.

The output terminal OUT of each of the driving stages SRC1 to SRCn is connected to a corresponding gate line of the gate lines GL1 to GLn. The gate signals generated by the driving stages SRC1 to SRCn are applied to the gate lines GL1 to GLn through the output terminals OUT.

The output terminal OUT of each of the driving stages SRC1 to SRCn is electrically connected to the input terminal IN of a next driving stage. Therefore, the input terminal IN of each of the driving stages SRC1 to SRCn receives the gate signal of a previous driving stage. For instance, the input terminal of the third driving stages SRC3 receives the second gate signal from the second driving stage SRC2. Among the driving stages SRC1 to SRCn, the input terminal IN of the first driving stage SRC1 receives a vertical start signal STV starting the operation of the gate driving circuit 101 instead of the gate signal of the previous driving stage.

The control terminal CT of each of the driving stages SRC1 to SRCn is electrically connected to the inverter terminal INV of the previous driving stage. The inverter terminal INV of each of the driving stages SRC1 to SRCn outputs the switching signal.

The control terminal CT of each of the driving stages SRC1 to SRCn receives the switching signal of the previous driving stage. For instance, the control terminal CT of the third driving stage SRC3 receives the second switching signal output from the inverter terminal INV of the second driving stage SRC2.

Referring to FIG. 9, the third driving stage SRC3" includes an output part 110A, a control part 120, a pull-down part 130A, an inverter part 140, and a discharge part 150. Compared to the output part 110 shown in FIG. 5, the output part 110A includes only the first output transistor TR1, and the second output transistor TR2 is removed from the output part 110A. The output electrode of the first output transistor TR1 outputs the third gate signal to the output terminal and applies the third gate signal to the input terminal IN of the next driving stage.

The control part 120 includes a third control transistor TR10' that has input and control electrodes commonly connected to the output terminal OUT. The output electrode of the third control transistor TR10' is connected to the second and third nodes NA and NB. The third control transistor TR10' is turned on in response to the third gate signal during the third scanning period to apply the third gate signal to the second and third nodes NA and NB. The electric potential of the second and third nodes NA and NB may be held to the high level of the third gate signal in the third scanning period. Therefore, the conditions of the withstanding voltage of the first and second control transistors TR3_1 and TR3_2 and the withstanding voltage of the first and second discharging transistors TR5_1 and TR5_2 may be relieved.

Compared to the pull-down part 130 shown in FIG. 5, the pull-down part 130A includes only the first pull-down transistor TR4, and the second pull-down transistor TR11 is removed from the pull-down part 130A. The output electrode of the first pull-down transistor TR4 applies the first discharge voltage VSS1 to the output terminal OUT in response to the second switching signal. The other transistors shown in FIG. 9 have the same connection structure as the transistors shown in FIG. 5, thus details thereof will be omitted.

Figure 10:
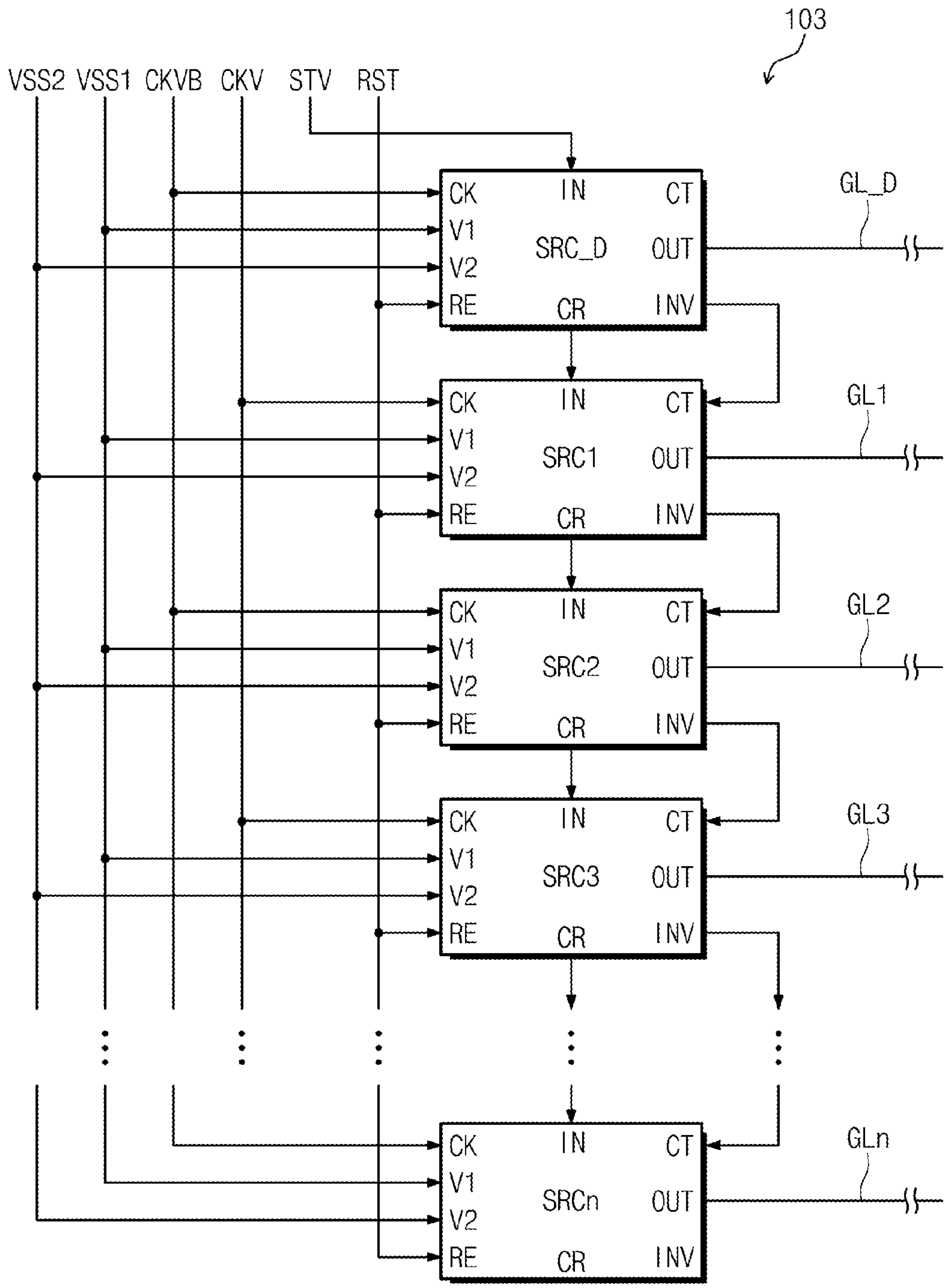
FIG. 10 is a block diagram showing a gate driving circuit, according to another exemplary embodiment of the present disclosure.
Figure 11:
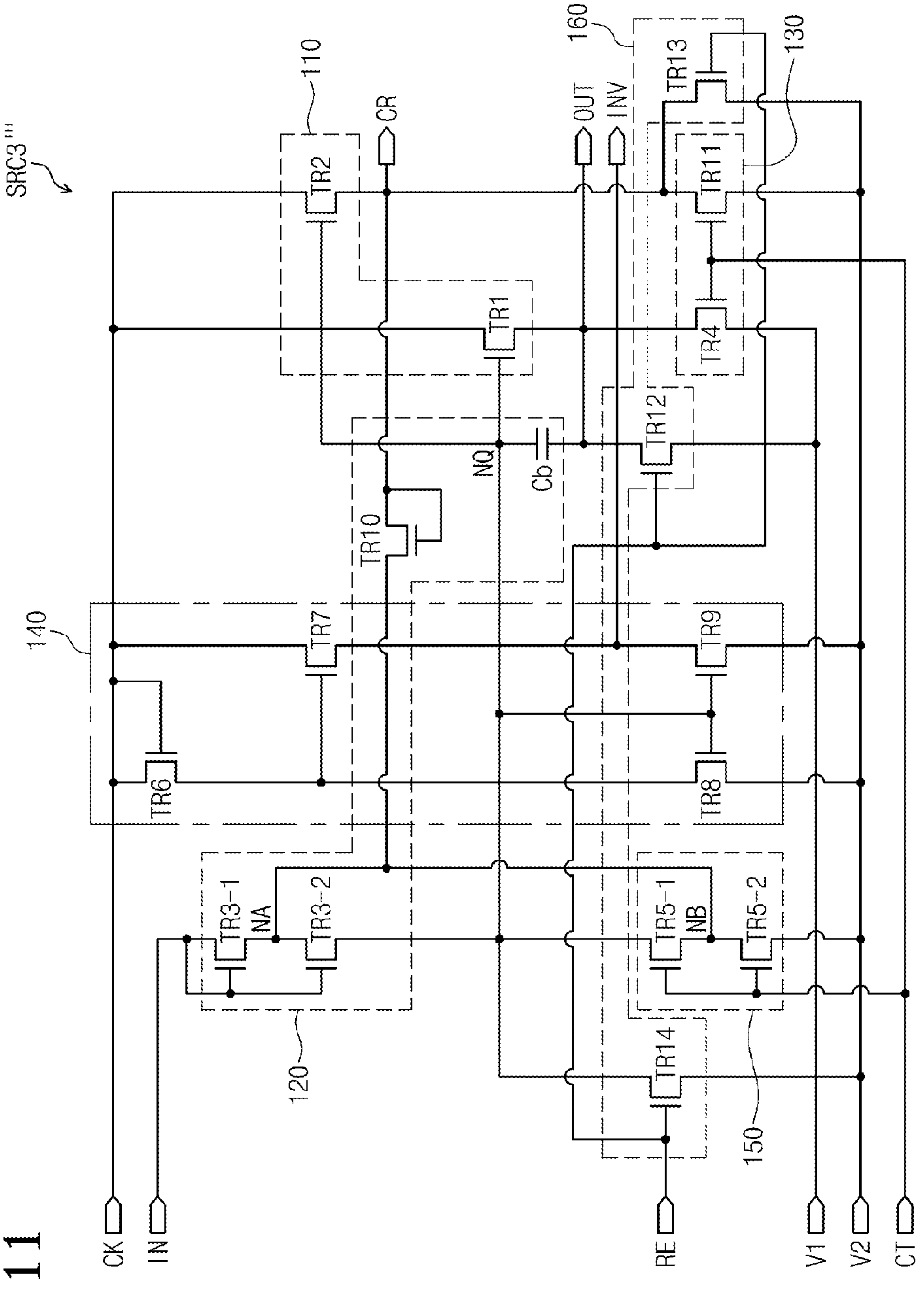
FIG. 11 is a circuit diagram showing a driving stage shown in FIG. 8.

FIG. 10 is a block diagram showing a gate driving circuit 103, according to another exemplary embodiment of the present disclosure. FIG. 11 is a circuit diagram showing a driving stage shown in FIG. 8. In FIGS. 10 and 11, the same reference numerals denote the same elements in FIGS. 4 and 5, and detailed descriptions of the same elements will be omitted.

Referring to FIG. 10, the gate driving circuit 103 includes a plurality of driving stages SRC1 to SRCn. Each of the driving stages SRC1 to SRCn includes an output terminal OUT, a carry terminal CR, an input terminal IN, a control terminal CT, an inverter terminal INV, a clock terminal CK, a first voltage input terminal V1, a second voltage input terminal V2, and a reset terminal RE. Each of the driving stages SRC1 to SRCn shown in FIG. 10 further includes the reset terminal RE. The reset terminal RE receives a low power signal RST provided from an external source, for example, the signal controller SC shown in FIG. 1. The low power signal RST holds the gate signals that are output from the gate driving circuit 103 to a low level during a stop period except for the driving period in which the gate driving circuit 103 is driven.

Referring to FIG. 11, a third driving stage SRC"' includes an output part 110, a control part 120, a pull-down part 130, an inverter part 140, a discharge part 150, and a hold part 160. The hold part 160 includes first, second, and third holding transistors TR12, TR13, and TR14. The first holding transistor TR12 includes a control electrode connected to the reset terminal RE, an input electrode connected to the first voltage input terminal V1, and an output electrode connected to the output terminal OUT. The second holding transistor TR13 includes a control electrode connected to the reset terminal RE, an input electrode connected to the second voltage input terminal V2, and an output electrode connected to the carry terminal CR. The third holding transistor TR14 includes a control electrode connected to the reset terminal RE, an input electrode connected to the second voltage input terminal V2, and an output electrode connected to the first node NQ.

The signal controller SC applies the low power signal RST to the gate driving circuit 103. In a low power mode, the gate driving circuit 103 is operated at a driving frequency lower than that of a normal mode. In the low power mode, the stop period, in which the gate driving circuit 103 is not operated, occurs, or a width of the stop period increases since the driving frequency is low. During the stop period, the low power signal RST controls the hold part 160 such that the electric potential of the output terminal OUT, the carry terminal CR, and the first node NQ is held to the first discharging voltage VSS1 or the second discharging voltage VSS2.

The first holding transistor TR12 is turned on in response to the low power signal RST to apply the first discharging voltage VSS1 to the output terminal OUT, and the second holding transistor TR13 is turned on in response to the low power signal RST to apply the second discharging voltage VSS2 to the carry terminal CR. Accordingly, the third gate signal and the third carry signal that are respectively applied to the output terminal OUT and the carry terminal CR may be held in the first and second discharging voltages VSS1 and VSS2, respectively, during the stop period.

When the hold part 160 is added to the driving stage SRC3", from which the second output transistor TR2 is removed as shown in FIG. 9, the second holding transistor TR13 may be omitted from the second holding transistor TR13 from the hold part 160.

The third holding transistor TR3 is turned on in response to the low power signal RST to apply the second discharging voltage VSS2 to the first node NQ. The second discharging voltage VSS2 has the voltage level lower than that of the first discharging voltage VSS1. When the electric potential of the first node NQ is lower than the electric potential of the output terminal OUT, a gate-source voltage Vgs of the first output transistor TR1 is low, thus an off-current of the first output transistor TR1 may be prevented from increasing. Therefore, the current leakage at the first node NQ may be reduced during the stop period.

Figure 12:
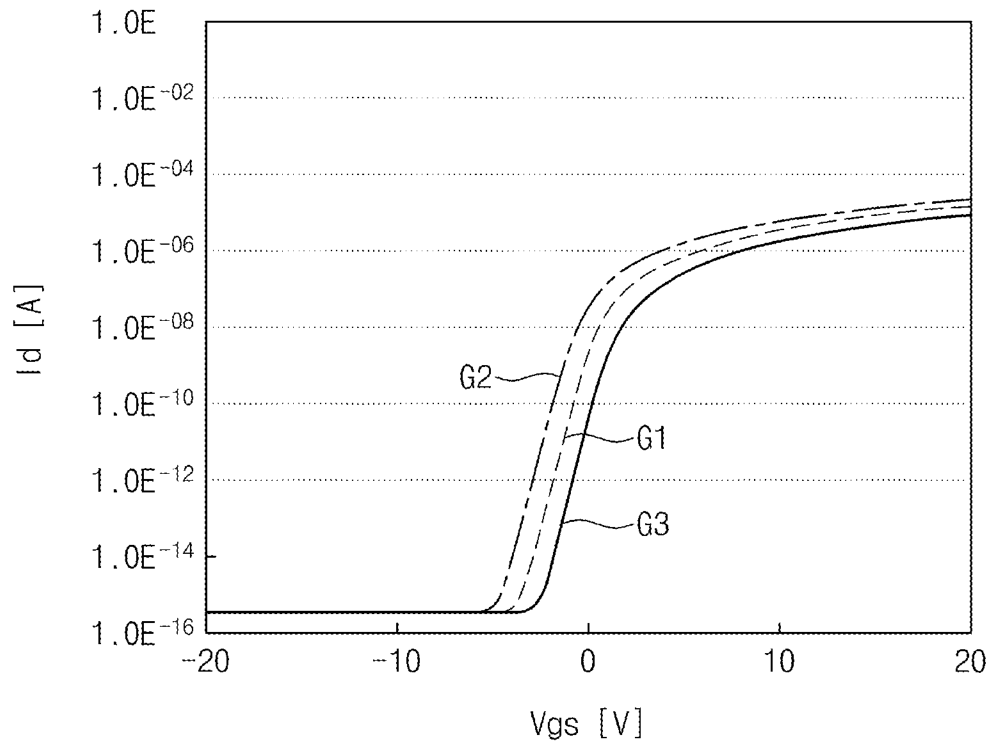
FIG. 12 is a waveform diagram showing a voltage-current characteristic of an oxide semiconductor transistor due to a process deviation.

FIG. 12 is a waveform diagram showing a voltage-current characteristic of an oxide semiconductor transistor due to a process deviation. In FIG. 12, a first graph G1 shows the voltage-current characteristic of the oxide semiconductor transistor having a typical-typical (TT) corner characteristic, a second graph G2 shows the voltage-current characteristic of the oxide semiconductor transistor having a fast-fast (FF) corner characteristic, and a third graph G3 shows the voltage-current characteristic of the oxide semiconductor transistor having a slow-slow (SS) corner characteristic.

Referring to FIG. 12, a threshold voltage of the oxide semiconductor transistor having the FF corner characteristic is lower than that of the oxide semiconductor transistor having the TT and SS corner characteristic as represented by the first and third graphs G1 and G3. In addition, when the oxide semiconductor transistor has the FF corner characteristic, the current leakage increases more than that when the oxide semiconductor transistor has the TT corner characteristic on the condition of the same source-gate voltage Vgs.

Figure 13A:
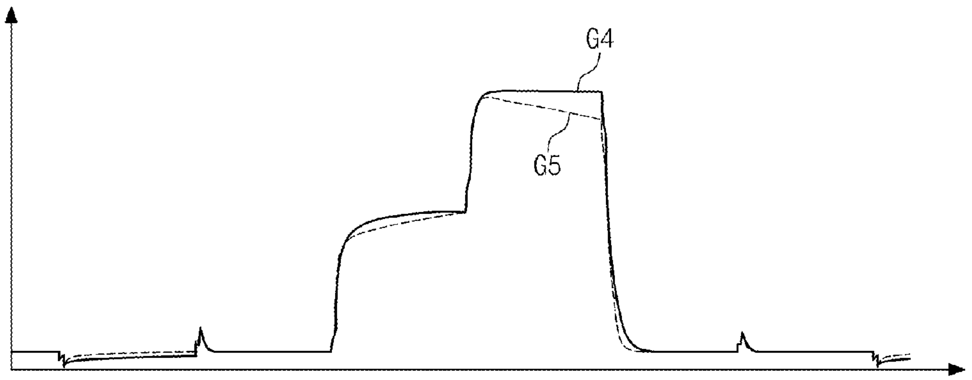
FIG. 13A is a waveform diagram showing a voltage waveform at a first node of a driving stage included in a gate driving circuit, according to a comparison example.
Figure 13B:
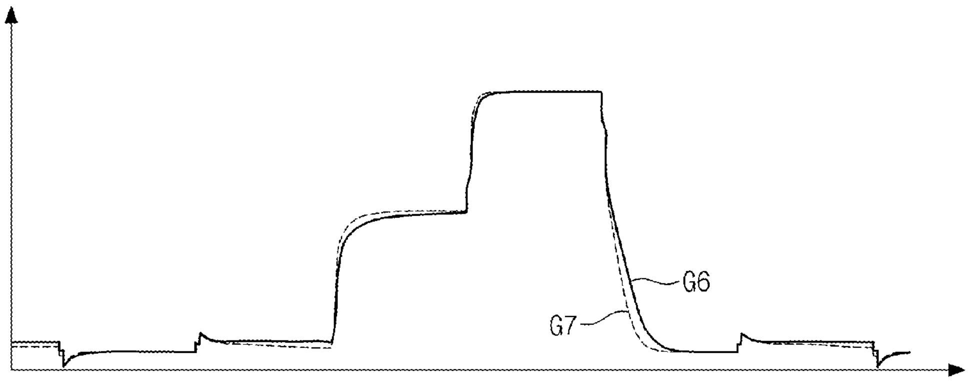
FIG. 13B is a waveform diagram showing a voltage waveform at a first node of a driving stage shown in FIG. 5.

FIG. 13A is a waveform diagram showing a voltage waveform at a first node of a driving stage included in a gate driving circuit, according to a comparison example. FIG. 13B is a waveform diagram showing a voltage waveform at the first node of the driving stage shown in FIG. 5. The driving stage of the gate driving circuit according to the comparison example has a circuit configuration obtained by removing the third control transistor TR10 from the driving stage SRC3 shown in FIG. 5.

In FIG. 13A, a fourth graph G4 shows a voltage waveform of the first node when the oxide semiconductor transistor having the TT corner characteristic is applied to the gate driving circuit, and a fifth graph G5 shows a voltage waveform of the first node when the oxide semiconductor transistor having the FF corner characteristic is applied to the gate driving circuit. When the oxide semiconductor transistor having the TT corner characteristic is applied to the gate driving circuit, the voltage waveform of the first node is output normally. However, when the oxide semiconductor transistor having the FF corner characteristic is applied to the gate driving circuit, a distortion, in which the electric potential of the first node becomes lower than a normal electric potential, occurs during a corresponding scanning period. When the oxide semiconductor transistor having the FF corner characteristic is applied to the gate driving circuit, the current leakage increases at the first node during the scanning period, thus the electric potential becomes lower than a normal level.

In FIG. 13B, a sixth graph G6 shows a voltage waveform of the first node NQ when the oxide semiconductor transistor having the TT corner characteristic is applied to the gate driving circuit 100, and a seventh graph G7 shows a voltage waveform of the first node NQ when the oxide semiconductor transistor having the FF corner characteristic is applied to the gate driving circuit 100. When the gate driving circuit 100 employs the driving stage having the circuit configuration as shown in FIG. 5, the electric potential of the first node NQ is maintained at the normal level regardless of the TT or FF corner characteristic of the transistors employed in the driving stage. Therefore, the current leakage may be prevented from increasing at the first node NQ.

In addition, when the current leakage of the first node NQ is reduced, a margin in a high temperature environment expands, and a capacitance of the capacitor Cb (refer to FIG. 5) may be reduced. When the capacitance of the capacitor Cb is reduced, an overall size of the gate driving circuit 100 may be reduced. For example, a width (i.e., a width of bezel) of the non-display area NDA (refer to FIG. 1) of the display apparatus 100 may be reduced to reduce the size of the gate driving circuit 100.

Although the exemplary embodiments of the present disclosure have been described, it is understood that the present disclosure should not be limited to these exemplary embodiments but various changes and modifications can be made by one ordinary skilled in the art within the spirit and scope of the present disclosure.

What is claimed is:

1. A gate driving circuit comprising:

a plurality of driving stages applying gate signals to gate lines of a display panel, a k-th (k being a natural number equal to or greater than 2) driving stage of the plurality of driving stages comprising:

an output part that is connected to a first node and outputs a k-th gate signal in response to a voltage of the first node;

a control part that controls an electric potential of the first node;

an inverter part that outputs a k-th switching signal; and a pull-down part that receives a (k−1)th switching signal from a (k−1)th driving stage of the plurality of driving stages and lowers a voltage of the output part in response to the (k−1)th switching signal, wherein the control part comprises a second node and a third control transistor, wherein the output part comprises a second output transistor comprising an output electrode, and wherein the third control transistor is diode-connected between the second node and the output electrode of the second output transistor to form a current path between the second node and the output electrode of the second output transistor.

2. The gate driving circuit of claim 1, wherein the output part comprises a first output transistor comprising a control electrode connected to the first node, an input electrode receiving a clock signal, and an output electrode outputting the k-th gate signal generated based on the clock signal.

3. The gate driving circuit of claim 2, wherein the pull-down part comprises a first pull-down transistor comprising a control electrode receiving the (k−1)th switching signal, an input electrode receiving a first discharging voltage, and an output electrode connected to the output electrode of the first output transistor.

4. The gate driving circuit of claim 3, wherein the second output transistor further comprises a control electrode connected to the first node and an input electrode receiving the clock signal, wherein the output electrode of the second output transistor outputs a k-th carry signal generated based on the clock signal.

5. The gate driving circuit of claim 4, wherein the pull-down part further comprises a second pull-down transistor comprising a control electrode receiving the (k−1)th switching signal, an input electrode receiving a second discharging voltage, and an output electrode connected to the output electrode of the first output transistor.

6. The gate driving circuit of claim 5, wherein the second discharging voltage has an electric potential lower than an electric potential of the first discharging voltage.

7. The gate driving circuit of claim 5, wherein the control part further comprises:

a first control transistor that outputs a first control signal to the second node and controls the electric potential of the first node in response to a (k−1)th carry signal before the k-th gate signal is output;

a second control transistor that receives the first control signal and outputs a second control signal to the first node in response to the (k−1)th carry signal before the k-th gate signal is output; and a capacitor connected between the output electrode of the first output transistor and the first node.

8. The gate driving circuit of claim 7, wherein the k-th driving stage further comprises a discharge part that lowers the electric potential of the first node to the second discharging voltage in response to the (k−1)th switching signal.

9. The gate driving circuit of claim 8, wherein the discharge part comprises a first discharging transistor and a second discharging transistor that are serially connected between the first node and a voltage terminal that is applied with the second discharging voltage, wherein the first discharging transistor comprises a control electrode receiving the (k−1)th switching signal, an input electrode connected to a third node, and an output electrode connected to the first node, and wherein the second discharging transistor comprises a control electrode receiving the (k−1)th switching signal, an input electrode receiving the second discharging voltage, and an output electrode connected to the third node.

10. The gate driving circuit of claim 9, wherein the third control transistor is diode-connected between the third node and the output electrode of the second output transistor to form a current path between the third node and the output electrode of the second output transistor.

11. The gate driving circuit of claim 4, wherein the k-th driving stage further comprises a hold part to hold the electric potential of one or more of the k-th gate signal, the k-th carry signal, and the first node in a low level in response to a low power signal during a stop period of a low power mode.

12. The gate driving circuit of claim 11, wherein the hold part comprises:

a first holding transistor comprising a control electrode receiving the low power signal, an input electrode receiving the first discharging voltage, and an output electrode outputting the first discharging voltage to the output terminal;

a second holding transistor comprising a control electrode receiving the low power signal, an input electrode receiving the second discharging voltage, and an output electrode outputting the second discharging voltage to the carry terminal; and a third holding transistor comprising a control electrode receiving the low power signal, an input electrode receiving the second discharging voltage, and an output electrode outputting the second discharging voltage to the first node.

13. The gate driving circuit of claim 12, wherein the second discharging voltage has an electric potential lower than an electric potential of the first discharging voltage.

14. The gate driving circuit of claim 4, wherein the inverter part comprises:

a first inverter transistor comprising an input electrode and a control electrode commonly receiving the clock signal and an output electrode;

a second inverter transistor comprising an input electrode receiving the clock signal, a control electrode connected to the output electrode of the first inverter transistor, and an output electrode outputting the (k−1)th switching signal;

a third inverter transistor comprising an output electrode connected to the output electrode of the first inverter transistor, a control electrode connected to the first node, and an input electrode receiving one of the first discharging voltage and the second discharging voltage; and a fourth inverter transistor comprising an output electrode connected to the output electrode of the second inverter transistor, a control electrode connected to the first node, and an input electrode receiving one of the first discharging voltage and the second discharging voltage.

15. The gate driving circuit of claim 4, further comprising a dummy stage that applies a dummy carry signal and a dummy switching signal to a first driving stage of the plurality of driving stages.

16. The gate driving circuit of claim 15, wherein the dummy stage starts an operation in response to a vertical start signal.

17. A display apparatus comprising:

a display panel comprising a plurality of pixels displaying an image, a plurality of gate lines receiving gate signals to drive the plurality of pixels, and a plurality of data lines receiving data signals;

a gate driving circuit disposed on the display panel and applying the gate signals to the gate lines; and a data driving circuit applying the data signals to the plurality of data lines, wherein the gate driving circuit comprising:

a plurality of driving stages applying the gate signals to the plurality of gate lines, a k-th (k being a natural number equal to or greater than 2) driving stage of the plurality of driving stages comprising:

an output part that is connected to a first node and outputs a k-th gate signal in response to a voltage of the first node;

a control part that controls an electric potential of the first node and has a second node;

an inverter part that outputs a k-th switching signal; and a pull-down part that receives a (k−1)th switching signal from a (k−1)th driving stage of the plurality of driving stages and lowers a voltage of the output part in response to the (k−1)th switching signal, wherein the control part includes a third control transistor that is diode-connected between the second node of the control part and an output electrode of an output transistor to form a current path between the second node and the output electrode of the output transistor.

18. The display apparatus of claim 17, further comprising a signal controller that applies a low power signal to the gate driving circuit, wherein the k-th driving stage further comprises a hold part that holds the first node and the k-th gate signal in response to the low power signal during a stop period in which an operation of the gate driving circuit is stopped.

19. The display apparatus of claim 18, wherein the output part further outputs a k-th carry signal in response to the voltage of the first node, and wherein the hold part further holds the k-th carry signal in response to the low power signal during the stop period.

* * * * *